Feb. 25, 1969
M. GARFINKEL ET AL
3,429,831
LITHIATED NICKEL OXIDE CRYSTALS
Filed Jan. 18, 1965
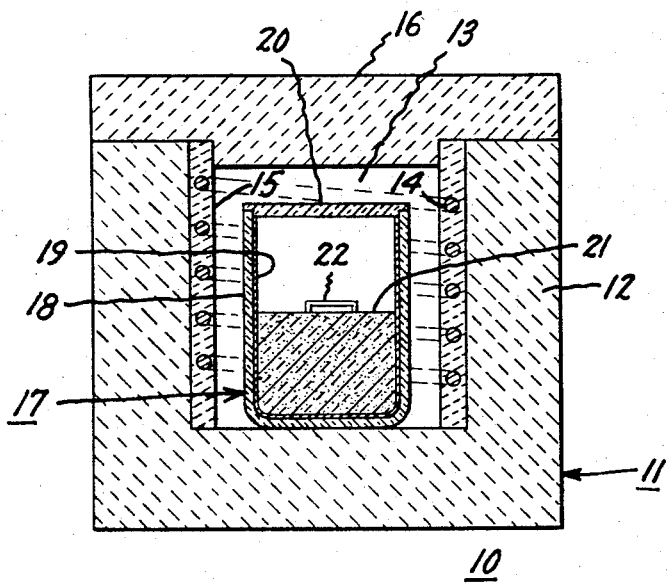
Inventors:
Marvin Garfinkel,
Joseph L. Weininger,
by Paul R. Webb, II
Their Attorney.

United States Patent Office 3,429,831
Patented Feb. 25, 1969

3,429,831
LITHIATED NICKEL OXIDE CRYSTALS
Marvin Garfinkel and Joseph L. Weininger, Schenectady, N.Y., assignors to General Electric Company, a corporation of New York
Filed Jan. 18, 1965, Ser. No. 426,293
U.S. Cl. 252—519          9 Claims
Int. Cl. C23c 9/00, 13/04

ABSTRACT OF THE DISCLOSURE

A single crystal of lithiated nickel oxide is disclosed which has a strain-free single crystal of nickel oxide, and lithium contained uniformly therein. A method is disclosed for forming a single crystal of lithiated nickel oxide which comprises the steps of providing a single crystal of nickel oxide, heating the crystal in an oxidizing atmosphere containing oxygen, heating the crystal at a temperature in a temperature range below the melting point of the crystal, heating the crystal in the presence of lithium, and diffusing lithium uniformly into the single crystal.

---

This invention relates to single crystals and to methods of making such crystals, and more particularly to single crystals of lithiated nickel oxide and to methods of making such crystals.

Single crystals of nickel oxide and lithiated nickel oxide have been produced by flame fusion. In the preparation of such lithiated nickel oxide crystals, powdered nickel oxide and powdered lithium oxide are mixed together and placed in a hopper. The powder is fed slowly from the hopper through an induction zone and onto a seed crystal mounted on one end of a rod. The rod is moved away slowly from the induction zone resulting in the formation of a boule of lithiated nickel oxide on the end of the rod. The boule will have generally an irregular surface. Usually, the material is highly strained because of its method of manufacture.

In the Transactions of American Society for Metals, volume 51, 1959, on pages 150–161 there is an article entitled, "Preparation of FeO, NiO, and CoO Crystals by Halide Decomposition" by R. E. Cech and E. I. Alessandrini. This article describes a new method for producing crystals of FeO, NiO, and CoO by elevated temperature decomposition of metal halide in an atmosphere which has water vapor in sufficient concentration to displace slightly the equilibrium in the direction of formation of the monoxide phase of the metal. The metal halide decomposition occurs on an MgO crystal surface and deposits the oxide as an epitaxially oriented crystal. The single crystal oxide is as large in area as the substrate MgO crystal and grows to a thickness which is determined by the amount of reactant supplied to the surface. Oxide single crystals 500 microns in thickness have been produced.

Single crystals of lithiated nickel oxide are useful as electrodes in electrochemical devices and would have application as semiconductors in electronic circuitry. When such a crystal is employed as an electrode in an electrochemical device, it should possess a large surface area, be thin in relation to the surface area, and have uniform conductivity. The lithium doping serves the purpose of increasing the conductivity of the crystal. Our present invention is directed to improved single crystals of lithiated nickel oxide which possess the above desirable characteristics, and to a method of forming such improved lithiated nickel oxide crystals.

It is an object of our invention to provide improved single crystals of lithiated nickel oxide.

It is another object of our invention to provide an improved method of forming single crystals of lithiated nickel oxide.

It is a further object of our invention to provide an improved single crystal of lithiated nickel oxide wherein the amount of lithium is predetermined.

In carrying out our invention in one form, a single crystal of lithiated nickel oxide comprises a strain-free single crystal of nickel oxide, and lithium contained uniformly therein.

These and various objects, features, and advantages of the invention will be better understood from the following description taken in connection with the accompanying drawing in which the single figure of the drawing is a sectional view of apparatus employed to form single crystals of lithiated nickel oxide in accordance with our invention.

In the single figure of the drawing, apparatus is shown generally at 10 which comprises a furnace 11 comprising an alumina tube 12, a central aperture 13, and heating coils 14 positioned on the interior surface of tube 12 by means of a thin layer of alumina 15. A cover 16 is shown as closing aperture 13. Container or vessel 17, which is positioned within aperture 13 of furnace 11, comprises an exterior wall 18 of alundum with an open upper end and an interior wall 19 of platinum foil. A cover 20 of alundum is provided to cover the upper open end of container 17. Additionally, a paste made, for example, from fine alumina grains, is used around the upper surface of wall portion 18 and cover 20 to cement the cover 20 to container 17. The cover is not sealed hermetically to the container.

Within container 17 there is packed a powder 21 which is formed initially from lithium carbonate and nickel carbonate. The initial mixture in varying proportions is heated to a temperaure of 900° C. in an air atmosphere for a period of one hour. After cooling, the resultant material is ground to provide powder 21. We have used, for example, initial mixtures to provide a resulting powder with 8.1 weight percent lithium oxide and 91.9 weight percent nickel oxide, and to provide a resulting powder with 30 weight percent lithium oxide and 70 weight percent nickel oxide.

A single crystal 22 of nickel oxide is positioned slightly above powder 21 within container 17. This crystal is made, for example, in accordance with the above-described Cech et al. process. While this crystal is shown supported slightly above mixture 21 by its legs, other positioning of the crystal is suitable to provide exposure to lithium within container 17.

We found that such a single crystal of nickel oxide was formed by using the above-described method of R. E. Cech et al. Such crystals exhibit a purity characterized by conductivity from $10^{-13}$ ohm$^{-1}$ cm.$^{-1}$, a large surface area, and thinness relative to the large surface area. We found that we could diffuse lithium uniformly into such a single crystal of nickel oxide to form an improved single crystal of lithiated nickel oxide. We discovered unexpectedly that an improved single crystal of lithiated nickel oxide was thus formed of a single crystal of strain-free nickel oxide.

Such single crystals of lithiated nickel oxide are electronically more conducting than oxide films formed in a conventional manner thereby providing improved electrodes for electrochemical devices. Further, such improved crystals provide semiconductors for electronic circuitry. In these latter devices the purity of the nickel oxide in the lithiated nickel oxide crystal appears to be important. We found further that such single crystals of lithiated nickel oxide did not have internal structural defects.

We found further that we could form a single crystal of lithiated nickel oxide by providing a single crystal of nickel oxide within an enclosure, heating the crystal in an oxidizing atmosphere containing oxygen, such as air or oxygen, heating the crystal at a temperature in a temperature range below the melting point of the crystal, heating the crystal in the presence of lithium, and diffusing lithium uniformly into the single crystal.

We found that the temperature employed in our method is dependent on the crystal thickness and the time of diffusion. We prefer to employ a high temperature in a temperature range from 1490° C. to below the melting point of the nickel oxide crystal, which is 1990° C., to secure an increased rate of diffusion of lithium into the nickel oxide crystal. In this preferred range of from 1500° C. to below 1900° C., we have found that best results were obtained by employing a temperature in a temperature range of 1650° C. to 1750° C. We found further that the heating of the crystal must be accomplished in both an oxidizing atmosphere and in the presence of lithium. For example, the lithium is present by employing lithium oxide, lithium doped nickel oxide powder, or a powder formed from sintered nickel carbonate and lithium carbonate.

An initial mixture in various proportions of lithium carbonate to nickel carbonate is suitable to provide a lithium containing powder. For example, a mixture was prepared to provide a resulting sintered powder with 8.1 weight percent of lithium oxide to 91.9 weight percent of nickel oxide. This was accomplished by employing a mixture of 36.77 grams of lithium carbonate and 663.0 grams of nickel carbonate. Similarly, an initial mixture was employed to provide a resulting sintered powder with 30 weight percent lithium oxide and 70 weight percent nickel oxide. This was accomplished by mixing together 136.2 grams of lithium carbonate and 505.0 grams of nickel carbonate. Both of the above initial mixtures were heated in an air atmosphere at a temperature of 900° C. for a period of one hour. The material which resulted from each of the above initial mixtures was ground subsequently to provide the powder for employment in our method.

We found that the lithium was diffused from the lithium contained in the hot powder into the single crystal of nickel oxide to provide an improved lithiated nickel oxide crystal.

We found that in accordance with our method, a pure and insulating single crystal of nickel oxide was made conducting by the diffusion of lithium into the crystal. We found further that in our method the initial single crystal of nickel oxide was not harmed but that any internal structural defects in the initial crystal were annealed out by the high temperature and time of the diffusion process.

We found that the powder served as the source of lithium ions for diffusion and provided a means of maintaining a lithium oxide atmosphere for the single crystal of nickel oxide, for a longer period of time than would be possible for lithium oxide in the temperature range which is employed in the process. We found further that the conditions for diffusing lithium into single crystals of nickel oxide so as to provide a uniformly doped crystal could be predetermined by calculating both the temperature and time necessary for such a diffusion from the crystal thickness and from the diffusion coefficient of lithium in nickel oxide. For example, there is set forth in Table I below the diffusion coefficients which have been determined experimentally for several temperatures.

TABLE I

1490° C. $D_{(Li\ in\ NiO)} = 1.74 \times 10^{-10}$ cm.$^2$/sec.
1598° C. $D_{(Li\ in\ NiO)} = 3.19 \times 10^{-10}$ cm.$^2$/sec.
1707° C. $D_{(Li\ in\ NiO)} = 1.0 \times 10^{-9}$ cm.$^2$/sec.

Examples of improved single crystals of lithiated nickel oxide which were formed in accordance with our method were as follows:

Example I

Apparatus was set up in accordance with the single figure of the drawing. A single crystal of nickel oxide which was 112 microns thick and produced in accordance with the above Cech et al. method was positioned slightly above the upper surface of a powder formed from an initial mixture of lithium carbonate and nickel carbonate heated to a temperature of 900° C. in an air atmosphere. The powder, which contained 0.58 weight percent of lithium, was contained within a vessel having an outer wall of alundum and an inner wall of platinum foil. An alundum cover was cemented to the upper open end of the vessel. The vessel was then positioned in a furnace of the type shown in the drawing and the furnace was heated to 1650° C. This heating was continued for a period of ten hours.

After this period of time, the heating was discontinued, and the vessel allowed to cool within the furnace. Subsequently, the vessel was removed from the furnace and it was opened by removal of its cover whereby the crystal could be removed therefrom. This method produced a single crystal of lithiated nickel oxide which comprised a strain-free single crystal of nickel oxide and 0.08 weight percent lithium contained uniformly therein. This lithiated nickel oxide crystal exhibited a conductivity of 0.081 ± 0.013 (ohm-cm.)$^{-1}$. The powder contained 0.10 weight percent lithium after the lithiated nickel oxide crystal was formed.

Example II

Apparatus was set up in accordance with the single figure of the drawing. A single crystal of nickel oxide which was 275 microns thick and produced in accordance with the above Cech et al. method was positioned slightly above the upper surface of a powder formed from an initial mixture of lithium carbonate and nickel carbonate heated to a temperature of 900° C. in an air atmosphere. The powder, which contained 3.1 weight percent of lithium, was contained within a vessel having an outer wall of alundum and an inner wall of platinum foil. An alundum cover was cemented to the upper open end of the vessel. The vessel was then positioned in a furnace of the type shown in the drawing and the furnace was heated to 1670° C. This heating was continued for a period of 37.5 hours.

After this period of time, the heating was discontinued, and the vessel allowed to cool within the furance. Subsequently, the vessel was removed from the furance and it was opened by removal of its cover whereby the crystal could be removed therefrom. This method produced a single crystal of lithiated nickel oxide which comprised a strain-free single crystal of nickel oxide and 0.35 weight percent lithium contained uniformly therein. This lithiated nickel oxide crystal exhibited a conductivity of 0.21 (ohm-cm.)$^{-1}$. The powder contained 0.54 weight percent lithium after the lithiated nickel oxide crystal was formed.

Example III

Apparatus was set up in accordance with the single figure of the drawing. A single crystal of nickel oxide which was 140 microns thick and produced in accordance with the above Cech et al. method was positioned slightly above the upper surface of a powder formed from an initial mixture of lithium carbonate and nickel carbonate heated to a temperature of 900° C. in an air atmosphere. The powder, which contained 0.49 weight percent of lithium was contained within a vessel having an outer wall of alundum and an inner wall of platinum foil. An alundum cover was cemented to the upper open end of the vessel. The vessel was then positioned in a furnace of the type shown in the drawing and the furnace was heated to 1670° C. This heating was continued for a period of 27 hours.

After this period of time, the heating was discontinued, and the vessel allowed to cool within the furnace. Subsequently, the vessel was removed from the furnace and it was opened by removal of its cover whereby the crystal could be removed therefrom. This method produced a single crystal of lithiated nickel oxide which comprised a strain-free single crystal of nickel oxide and 0.51 weight percent lithium contained uniformly therein. This lithiated nickel oxide crystal exhibited a conductivity of 0.041 (ohm-cm.)$^{-1}$. The powder contained 0.17 weight percent lithium after the lithiated nickel oxide crystal was formed.

We found also that we could form a single crystal of lithiated nickel oxide in an atmosphere of gaseous lithium oxide. This latter method comprises providing a single crystal of nickel oxide within an enclosure, preheating a lithium containing material in an oxidizing atmosphere containing oxygen to oxidize the material to a gaseous oxide containing lithium, supplying the gaseous oxide containing lithium to the enclosure, and diffusing lithium from the gaseous oxide uniformly into the single crystal. In the method, we employ a gaseous oxide of lithium as the source of lithium ions for diffusion and for maintaining a lithium oxide atmosphere, for the crystal.

Similar temperatures and diffusion times, as in the first described method are also employed in this method. Since the gaseous oxide is supplied from a source other than the enclosure, a sufficient supply is available without a depletion of lithium ions for the diffusion. While various lithium containing materials, which will oxidize to an oxide containing lithium, are suitable, we prefer to employ lithium carbonate as the lithium containing material.

While other modifications of this invention and variations thereof which may be employed within the scope of the invention have not been described, the invention is intended to include such as may be embraced within the following claims.

What we claim as new and desire to secure by Letters Patent of the United States is:

1. A method of forming a single crystal of lithiated nickel oxide which comprises providing a single crystal of nickel oxide, heating said crystal in an oxidizing atmosphere containing oxygen, heating said crystal at a temperature in a temperature range below the melting point of said crystal, heating said crystal in the presence of lithium, and diffusing lithium uniformly into said single crystal.

2. A method of forming a single crystal of lithiated nickel oxide which comprises providing a single crystal of nickel oxide, heating said crystal in an oxidizing atmosphere containing oxygen, heating said crystal at a temperature in a temperature range of from 1500° C. to below the melting point of said crystal, heating said crystal in the presence of lithium, and diffusing lithium uniformly into said single crystal.

3. A method of forming a single crystal of lithiated nickel oxide which comprises providing a single crystal of nickel oxide, heating said crystal in an oxidizing atmosphere containing oxygen, heating said crystal at a temperature in a temperature range of 1650° C. to 1750° C., heating said crystal in the presence of lithium and diffusing lithium uniformly into said single crystal.

4. A method of forming a single crystal of lithiated nickel oxide which comprises providing a single crystal of nickel oxide, heating said crystal in an oxidizing atmosphere containing oxygen, heating said crystal at a temperature in a temperature range below the melting point of said crystal, heating said crystal in the presence of a hot sintered powder containing nickel oxide and lithium oxide, and diffusing lithium from said hot powder uniformly into said single crystal.

5. A method of forming a single crystal of lithiated nickel oxide which comprises providing a single crystal of nickel oxide, heating said crystal in an oxidizing atmosphere containing oxygen, heating said crystal at a temperature in a temperature range of from 1500° C. to below the melting point of said crystal, heating said crystal in the presence of a hot sintered powder containing nickel oxide and lithium oxide, and diffusing lithium from said hot powder uniformly into said single crystal.

6. A method of forming a single crystal of lithiated nickel oxide which comprises providing a single crystal of nickel oxide, heating said crystal in an oxidizing atmosphere containing oxygen, heating said crystal at a temperature in a temperature range of 1650° C. to 1750° C., heating said crystal in the presence of a hot sintered powder containing nickel oxide and lithium oxide, and diffusing lithium from said hot powder uniformly into said single crystal.

7. A method of forming a single crystal of lithiated nickel oxide which comprises providing a single crystal of nickel oxide, heating said crystal in an oxidizing atmosphere containing oxygen, heating said crystal at a temperature in a temperature range of 1650° C. to 1750° C., heating said crystal in the presence of a hot sintered powder containing nickel oxide and lithium oxide, heating said crystal for a period from 12 hours to 72 hours, and diffusing lithium from said hot powder uniformly into said single crystal.

8. A method of forming a single crystal of lithiated nickel oxide which comprises providing a single crystal of nickel oxide within an enclosure, preheating a lithium containing material in an oxidizing atmosphere containing oxygen to decompose said material to a gaseous oxide containing lithium, supplying said gaseous oxide containing lithium to said enclosure, and diffusing lithium from said gaseous oxide uniformly into said single crystal.

9. A method of forming a single crystal of lithiated nickel oxide which comprises providing a single crystal of nickel oxide within an enclosure, preheating a lithium carbonate in an oxidizing atmosphere containing oxygen to decompose said material to gaseous lithium oxide, supplying said gaseous lithium oxide to said enclosure, and diffusing lithium from said gaseous lithium oxide uniformly into said single crystal.

References Cited

UNITED STATES PATENTS 2,993,011   7/1961   Johnston et al. ___ 252—518 XR
2,985,700   5/1961   Johnston et al. _____ 136—5

LEON D. ROSDOL, *Primary Examiner.*

J. D. WELSH, *Assistant Examiner.*

U.S. Cl. X.R.

252—62.3, 518; 204—292; 23—300